US007010648B2

(12) United States Patent
Kadambi et al.

(10) Patent No.: US 7,010,648 B2
(45) Date of Patent: Mar. 7, 2006

(54) METHOD AND APPARATUS FOR AVOIDING CACHE POLLUTION DUE TO SPECULATIVE MEMORY LOAD OPERATIONS IN A MICROPROCESSOR

(75) Inventors: Sudarshan Kadambi, Hayward, CA (US); Vijay Balakrishnan, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 331 days.

(21) Appl. No.: 10/658,663

(22) Filed: Sep. 8, 2003

(65) Prior Publication Data

US 2005/0055533 A1    Mar. 10, 2005

(51) Int. Cl.
*G06F 12/00* (2006.01)
(52) U.S. Cl. .................... 711/118; 711/125; 711/144; 711/154; 711/156
(58) Field of Classification Search ................ 711/118, 711/125, 144, 154, 156
See application file for complete search history.

(56) References Cited

U.S. PATENT DOCUMENTS

| 4,466,057 | A | * | 8/1984 | Houseman et al. ......... 712/210 |
| 4,481,571 | A | * | 11/1984 | Pilat et al. .................. 712/221 |
| 4,503,492 | A | * | 3/1985 | Pilat ........................... 711/202 |
| 4,516,203 | A | * | 5/1985 | Farber et al. .................. 711/3 |
| 5,396,604 | A | * | 3/1995 | DeLano et al. ............. 712/207 |
| 5,555,392 | A | * | 9/1996 | Chaput et al. .............. 711/118 |
| 5,931,957 | A | * | 8/1999 | Konigsburg et al. .......... 714/48 |
| 6,374,344 | B1 | * | 4/2002 | Webb et al. ................. 712/205 |
| 2002/0087794 | A1 | * | 7/2002 | Jouppi et al. ............... 711/126 |
| 2003/0074533 | A1 | * | 4/2003 | Luick .......................... 711/125 |

OTHER PUBLICATIONS

Clark et al., "Performance Evaluation of Configurable Hardware Features on the AMD-K5," pp 102-107, Intl Conference on Computer Design, 1999, (ICCD '99), Oct. 1999.*

* cited by examiner

*Primary Examiner*—Stephen C. Elmore
(74) *Attorney, Agent, or Firm*—Gunnison, McKay & Hodgson, L.L.P.; Philip J. McKay (57) ABSTRACT

A cache pollution avoidance unit includes a dynamic memory dependency table for storing a dependency state condition between a first load instruction and a sequentially later second load instruction, which may depend on the completion of execution of the first load instruction for operand data. The cache pollution avoidance unit logically ANDs the dependency state condition stored in the dynamic memory dependency table with a cache memory "miss" state condition returned by the cache pollution avoidance unit for operand data produced by the first load instruction and required by the second load instruction. If the logical ANDing is true, memory access to the second load instruction is squashed and the execution of the second load instruction is re-scheduled.

10 Claims, 5 Drawing Sheets

FIG. 1

| Instruction | Type | Operation |
|---|---|---|
| A | Producer Load | LOAD (address1, r1) |
| B | Calculation | ADD (r1, r2, r3) |
| C | Consumer Load | LOAD (address2=r3, r4) |
| D | Independent Load | LOAD (address3=r5, r6) |

METHOD AND APPARATUS FOR AVOIDING CACHE POLLUTION DUE TO SPECULATIVE MEMORY LOAD OPERATIONS IN A MICROPROCESSOR

BACKGROUND OF THE INVENTION

1. Field of the Invention

The present invention relates generally to the storage of data in a microprocessor cache memory, and more particularly to a system, method, and microprocessor architecture for avoiding cache pollution caused by speculative memory operations.

2. Description of Related Art

Early computer processors, also called microprocessors, included a central processing unit or instruction execution unit that executed only one instruction at a time. Early microprocessors also executed instructions in an order determined by the compiled machine-language program running on the microprocessor and so are referred to as "sequential" microprocessors. In response to the need for improved performance, several techniques have been used to extend the capabilities of these early microprocessors including pipelining, superpipelining, superscaling, and speculative instruction execution.

Pipelined architectures break the execution of instructions into a number of stages where each stage corresponds to one step in the execution of the instruction. Pipelined designs increase the rate at which instructions can be executed by allowing a new instruction to begin execution before a previous instruction is finished executing. Pipelined architectures have been extended to "superpipelined" or "extended pipeline" architectures where each execution pipeline is broken down into even smaller stages (i.e., microinstruction granularity is increased). Superpipelining increases the number of instructions that can be executed in the pipeline at any given time.

"Superscalar" microprocessors generally refer to a class of microprocessor architectures that include multiple pipelines that process instructions in parallel. Superscalar microprocessors typically execute more than one instruction per clock cycle, on average. Superscalar microprocessors allow parallel instruction execution in two or more instruction execution pipelines. The number of instructions that may be processed is increased due to parallel execution.

The goal of superscalar and superpipeline microprocessors is to execute multiple instructions per microprocessor clock cycle. Instruction-level parallelism, such as Single Instruction Multiple Data instructions, available in programs can be exploited to realize this goal. Full exploitation of this potential parallelism requires that instructions be dispatched for execution at a sufficient rate.

However, the ability of modern high performance microprocessors to execute instructions has typically outpaced the ability of memory subsystems to supply instructions and data to the microprocessors. Thus, most high-performance modern microprocessors use cache memory systems with at least one level of high speed, on-chip cache memory to speed memory access.

Cache memory, sometimes simply called "cache", comprises one or more levels of dedicated high-speed memory for holding recently accessed instructions and data, designed to speed up subsequent access to the same instructions or data. Cache technology is based on the premise that programs frequently re-execute the same instructions or execute different instructions on recently accessed data.

When data is read from main memory, a cache system saves a copy of the data in the cache memory, along with an index to the associated main memory. The cache system then monitors subsequent requests for data to see if the information needed has already been stored in the cache.

If the cache system indicates that the data had indeed been stored in the cache, sometimes called a cache "hit", the data is delivered immediately to the microprocessor and the attempt to fetch the information from main memory is aborted (or not started). If, on the other hand, the data had not been previously stored in cache, sometimes called a cache "miss", then the requested data is fetched directly from main memory and also saved in the cache for future access.

Each cache entry is typically accessed by a unique address "tag" stored separately in a tag random access memory (RAM). A cache "hit" occurs whenever a memory access to the cache occurs and the cache system finds, through inspecting its tag memory, that the requested data is present and valid in the cache.

In superscalar microprocessors, multiple pipelines could simultaneously process instructions only when there were no data dependencies between the instructions in each pipeline. For example, when an instruction that operates on data fetched from memory is dependent upon one or more preceding instructions to load the required data into working operand registers, the dependent instruction cannot execute until all of the required stored data has been retrieved from cache or main memory.

Microprocessor instruction execution units in an execution pipeline cannot predict how long it may take to load data into the working operand registers specified by a particular load operation. Microprocessors typically handled this uncertainty by delaying execution until the fetched data is returned by "stalling" the execution pipeline. Consequently data dependencies caused one or more pipelines to wait for the dependent data to become available. This stalling was inconsistent with high speed, multiple instruction per cycle processing.

Speculative instruction execution was an attempt to address pipeline "stalls" in deeply pipelined microprocessors caused by data load operation uncertainty. Modern microprocessors pipeline memory operations allowed a second load operation to enter a load/store stage in an execution pipeline before a previous load instruction, the results on which the second load operation depends, has passed completely through the execution pipeline.

In such deeply pipelined, speculative instruction execution microprocessors, a dependent load instruction, sometimes called a consumer load instruction, dependent on a sequentially earlier load instruction, sometimes called a producer load instruction, may be scheduled for issue before confirmation that the load data required by the consumer load instruction is available in cache memory.

In such microprocessors there is a delay between the decision to issue an instruction and the actual execution of the instruction. Thus, in the case of load instructions, there may exist a significant delay between the issue of a load instruction and data fetch from cache memory. The load instruction is often said to be "in-flight" during this delay. Accordingly, a consumer load instruction, dependent on an "in-flight" producer load instruction, may be issued before the confirmation by the cache system that the load data required by the consumer load instruction is available in the cache. When the required data is not found in the cache, such dependent consumer load instructions could be executing with incorrect data operands. Consumer load instructions, directly or indirectly dependent on "in-flight" producer load instructions, executing with incorrect data operands, send erroneous data to the main memory and cache memory. Such consumer load instructions may cause useful data to be replaced in cache with erroneous data, i.e., data that will likely not be referenced by sequentially later program instructions. This replacement of erroneous data with useful data in the cache, sometimes referred to as cache pollution, often leads to poor cache system performance and thereby adversely effects processor performance and system throughput.

What is needed is a method and apparatus for minimizing or eliminating cache pollution caused by speculative memory load operations.

SUMMARY OF THE INVENTION

Embodiments of the present invention provide a method and microprocessor architecture to eliminate cache pollution caused by speculative memory load operations. The method includes determining whether a data dependency between particular consumer load instructions and a particular, sequentially earlier, producer load instructions is "true" or "false". The various dependency states of the consumer load instructions on the producer load instructions, sometimes called dependency state intersections, are then written to and stored in a cache pollution avoidance unit.

As used herein, a "true" dependency state condition of a given consumer load instruction on a given producer load instruction exists whenever the consumer load instruction depends on the results returned by the producer load instruction to provide operand data to the consumer load instruction. A "false" dependency state condition exists whenever the consumer load instruction does not depend on the producer load instruction to provide operand data.

Further, a "true" dependency state is said to be "direct" whenever no other instructions, upon which the consumer load instruction also depends, sequentially intervene between the producer load instruction and the consumer load instruction. If any other instructions, upon which the consumer load instruction also depends, do sequentially intervene between the producer load instruction and the consumer load instruction, the dependency of the consumer load instruction on the producer load instruction is said to be "indirect".

As may be appreciated, in one embodiment, a particular load instruction may be both a producer load instruction for a sequentially later load instruction which depends on the particular load instruction, while at the same time may be a consumer load instruction of a sequentially earlier load instruction from which the particular load instruction depends.

After the cache pollution avoidance unit acquires the "true"/"false" dependency state condition of a dependency state intersection between a consumer load instruction and a producer load instruction, the cache pollution avoidance unit acquires from the cache system the "miss" state in cache for operand data supplied at the completion of the producer load instruction and required by the dependent consumer load instruction.

In one embodiment of the invention, the cache "miss" state condition for operand data required by the consumer load instruction is next logically ANDed with the dependency state condition of the consumer load instruction on the producer load instruction.

The cache pollution avoidance unit of the present invention suppresses execution of, sometimes called squashing or being squashed, the consumer load instruction, thereby disallowing memory access to the consumer load instruction, whenever the logically ANDing of the dependency state condition and the cache "miss" state condition indicates both a "true" dependency condition for the consumer load instruction on the producer load instruction and a cache "miss" for the required consumer load instruction operand data.

Whenever an "in-flight" consumer load instruction is squashed by the cache pollution avoidance unit, the consumer load instruction is prevented from accessing main memory. Since, the consumer load instruction does not access main memory, erroneous data is not fetched into cache memory. Accordingly, use of the method of the present invention, employing a cache pollution avoidance unit, eliminates cache pollution caused by speculative memory operations of load instructions in a microprocessor.

In one embodiment, the various dependency state conditions between consumer load instructions and producer load instructions are stored as one-bit binary condition "flags" in a conventional RAM array making up a dynamic memory dependency table within the cache pollution avoidance unit. A "true" dependency state condition is represented by a binary bit value of "1" stored in a RAM memory cell and a "false" dependency state condition is represented by a bit value of "0".

Further in this embodiment, a "true" cache "miss" is represented by a "1" bit value returned by the cache system of the microprocessor to the cache pollution avoidance unit. A "false" cache "miss", i.e., a cache "hit", is represented by a bit value of "0" returned by the cache system of the microprocessor to the pollution avoidance unit.

Still further in this embodiment, the logical ANDing of the dependency state condition and the cache "miss" state condition is "true" when the logical ANDing outputs a bit value of "1".

Thus, in one embodiment of the invention, the logical ANDing of the dependency state condition and the cache "miss" state condition outputs a "1" bit value, whenever both the dependency state of a consumer load instruction on a producer load instruction, store in the dynamic memory dependency table, has a bit value of "1", and the cache pollution avoidance unit returns a bit value of "1", i.e., a cache "miss" for operand data produced by the producer load instruction and required by the consumer load instruction. In this embodiment, if the output of the logical ANDing by the cache pollution avoidance unit has a bit value of "1", memory access is squashed for the dependent consumer load instruction.

In one embodiment, after each determination of a "true" ANDing condition, the consumer load instruction is rescheduled by the microprocessor instruction scheduling unit and the logical ANDing of the dependency state and the cache "miss" state is re-determined by the cache pollution avoidance unit.

Once the logical ANDing of the dependency state condition of the consumer load instruction on the producer load instruction and the cache "miss" state condition is "false", i.e. when the cache "hits", the squash memory access for the dependent consumer load instruction is released by the cache pollution avoidance unit.

In this embodiment, the logical ANDing is "false" whenever the producer instruction has completed execution, the results of the producer instruction stored in registers, and the results copied to the cache. In this embodiment, the dependency between the producer load instruction and the consumer load instruction is de-asserted, i.e., set to logical "0".

After this point, the logical ANDing between the dependency state and the cache "miss" state is "false" since the registers contain the operand data required by the dependent consumer load instruction. The consumer load instruction is then able to compute the correct address and access memory and related cache to load the properly referenced load data.

In one embodiment of the invention, the logical ANDing of the dependency state and the cache "miss" state is performed in an "n" by "n" ANDing gate array where "n" equals the length of the instruction buffer of the microprocessor.

As will be appreciated by those skilled in the art, various other embodiments of the cache pollution avoidance unit according to the invention are possible relative to means of storing dependencies, means of performing logical operations, and means of storing, accessing, and decoding cache "miss" states.

BRIEF DESCRIPTION OF THE DRAWINGS

The accompanying drawings, which are incorporated in, and constitute a part of this specification, illustrate embodiments of the invention and, together with the description, serve to explain the principles of the invention. In the drawings.

DETAILED DESCRIPTION

Figure 1:
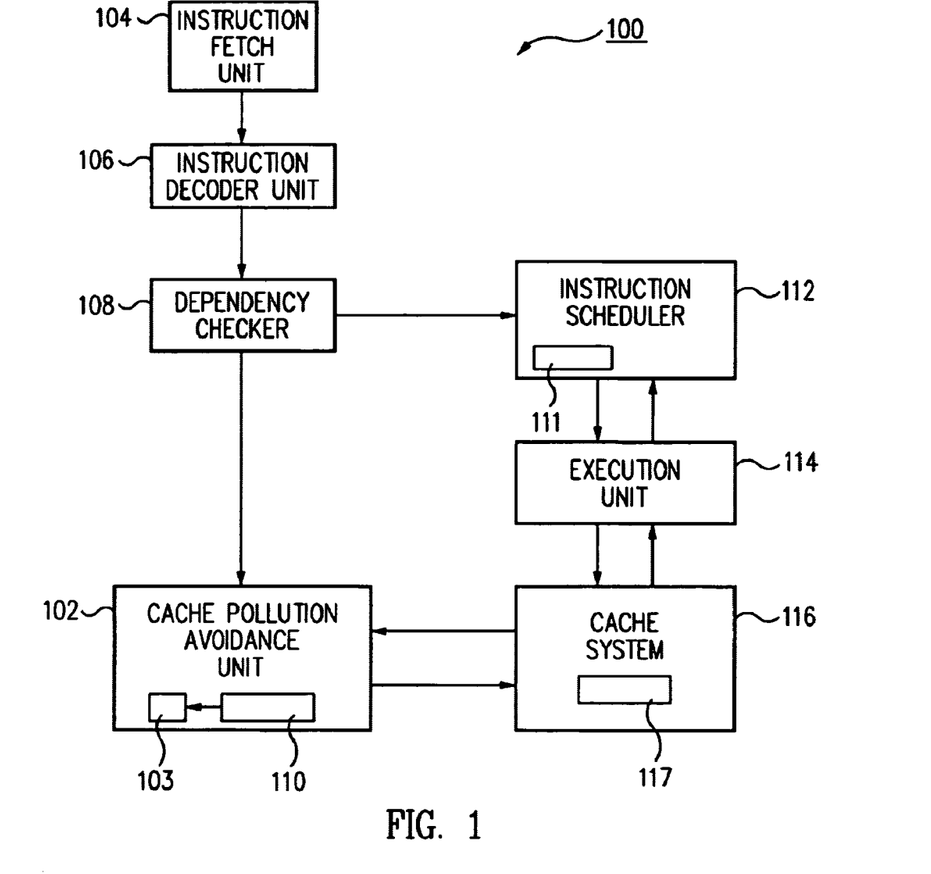
FIG. 1 is a block diagram of a microprocessor system including an embodiment of a cache pollution avoidance unit 102 according to the present invention for avoiding cache pollution due to speculative memory operations.

FIG. 1 is a block diagram of a microprocessor system 100 including an embodiment of a cache pollution avoidance unit 102 according to the present invention for avoiding cache pollution due to speculative memory operations. Microprocessor program instructions from an instruction cache (not shown) are fetched by an instruction fetch unit 104 and decoded in an instruction decode unit 106 in a manner well known to those of skill in the art. As is also known in the art, as instructions are fetched and decoded, dependency states between producer load instructions and consumer load instructions are determined as "true" or "false" in a dependency checker 108.

Dependency checker 108 is coupled to an instruction scheduler 112. The dependency state conditions determined by dependency checker 108 are stored in instruction scheduler 112, which further contains an "n" wide instruction buffer 111. In one embodiment, instruction scheduler 112 uses the dependency state information to dispatch instructions contained in instruction buffer 111 for execution when instruction operands become available.

As described more fully below with reference to FIG. 5, according to one embodiment of the present invention, dependency checker 108 is also coupled to "n" row by "n" column dynamic memory dependency table 110 contained within cache pollution avoidance unit 102. As also described more fully below with reference to FIG. 5, in one embodiment, an ANDing gate array 103 within cache pollution avoidance unit 102 is also coupled to dynamic memory dependency table 110.

Instructions are fetched/decoded by instruction fetch unit 104 and instruction decode unit 106, and dependency checker 108 writes the various dependency state conditions among the fetched producer load instructions and consumer load instructions to dynamic memory dependency table 110.

As noted above, dependency checker 108 is coupled to instruction scheduler 112 and instruction scheduler 112, in turn, is coupled to an execution unit 114. Instruction scheduler 112 schedules the order of execution by execution unit 114 of microprocessor program instructions contained in instruction buffer 111. For clarity of presentation, execution unit 114 is discussed generically as executing an operation appropriate to a particular instruction. Those of skill in the art will recognize that modern microprocessor contain many execution units, such as floating-point units and integer units, that perform microprocessor functions appropriate to the operation being executed.

After an instruction in instruction buffer 111 is executed by execution unit 114, a sequentially later microprocessor instruction replaces the executed instruction in instruction buffer 111. As also described more fully below with reference to FIG. 5, when sequentially later instructions replace executed instructions in the instruction buffer 111, cache pollution avoidance unit 102 updates dynamic memory dependency table 110 to reflect dependencies among producer load instructions and consumer load instructions then in instruction buffer 111.

In one embodiment, a cache system 116 is coupled to both execution unit 114 and cache pollution avoidance unit 102. When instruction scheduler 112 schedules a particular consumer load instruction for execution in execution unit 114, cache pollution avoidance unit 102 receives a cache "miss" state condition returned by cache system 116 for operand data required by the particular consumer load instruction and supplied by a particular producer load instruction on which it depends.

ANDing gate array 103 logically ANDs the cache "miss" state condition for the operand data required by the particular dependent consumer load instruction with the dependency state condition, previously stored in dynamic memory dependency table 110, between the particular consumer load instruction and the particular producer load instruction on which it depends.

If, for a particular consumer load instruction and a particular producer load instruction, the result of the logical ANDing of the cache "miss" state condition and the dependency state condition is true, i.e., if both the cache "miss" state condition and the dependency state condition true, access to the microprocessor memory system (not shown) and cache system 116 is denied to that particular consumer load instruction by cache pollution avoidance unit 102.

Figure 2:
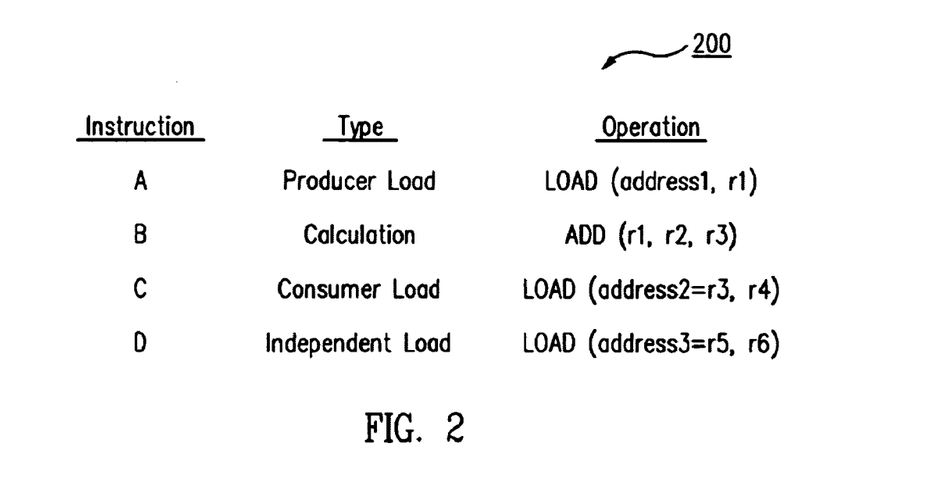
FIG. 2 is a microprocessor program instruction sequence forming a portion of a microprocessor program for execution on the microprocessor system of FIG. 1.

Illustratively, FIG. 2 is a microprocessor program instruction sequence forming a portion of a microprocessor program for execution on the microprocessor system 100 of FIG. 1. A producer load instruction "A" is a conventional microprocessor load instruction that fetches the data contained in a microprocessor memory at a first memory location address1 into a microprocessor first register r1.

The data contained in first register r1, after execution of producer load instruction "A" is sequentially next operated on by a calculation instruction "B". In the example given, calculation instruction "B" is conventional microprocessor "add" instruction. The operation of calculation instruction "B" arithmetically adds to the data now in first register r1, by way of execution the operation of producer load instruction "A", to the data currently in a microprocessor second register r2. The result of that addition is returned to a microprocessor third register r3.

The data contained in third register r3, after execution the "add" operation of calculation instruction "B", is sequentially next operated on by a consumer load instruction "C". Consumer load instruction "C" is a conventional microprocessor load instruction. Consumer load instruction "C" loads the data in a microprocessor memory at a second memory location address2 into a microprocessor fourth register r4.

In this example however, the memory location from which consumer instruction "C" loads data is shown as second memory location address2. The accurate determination of second memory location address2 depends directly from the results produced by the "add" operation of calculation instruction "B", which in turn depends directly from the results returned by the operation of producer load instruction "A". Thus, accurate determination of second memory location the operation of producer load instruction "A", by way of the results produced by the "add" operation of calculation instruction "B".

The loading of first address location address1 into first register r1 must be completed before an accurate determination can be made for second memory location address2 contained in third register r3 at the completion of calculation instruction "B", and before the data contained in second memory location address2 may be accurately loaded into fourth register r4 by operation of first consumer load instruction "C". If first consumer load instruction "C" is allowed to execute by microprocessor system 100 before the loading of first address location address1 into first register r1 is complete, address2 data loaded into fourth register r4 may be erroneous. When cache system 116 copies erroneous second memory location address2 data in fourth register r4, the entire data block from erroneous second memory location address2 is written into cache memory 117 and cache pollution results.

Figure 3:
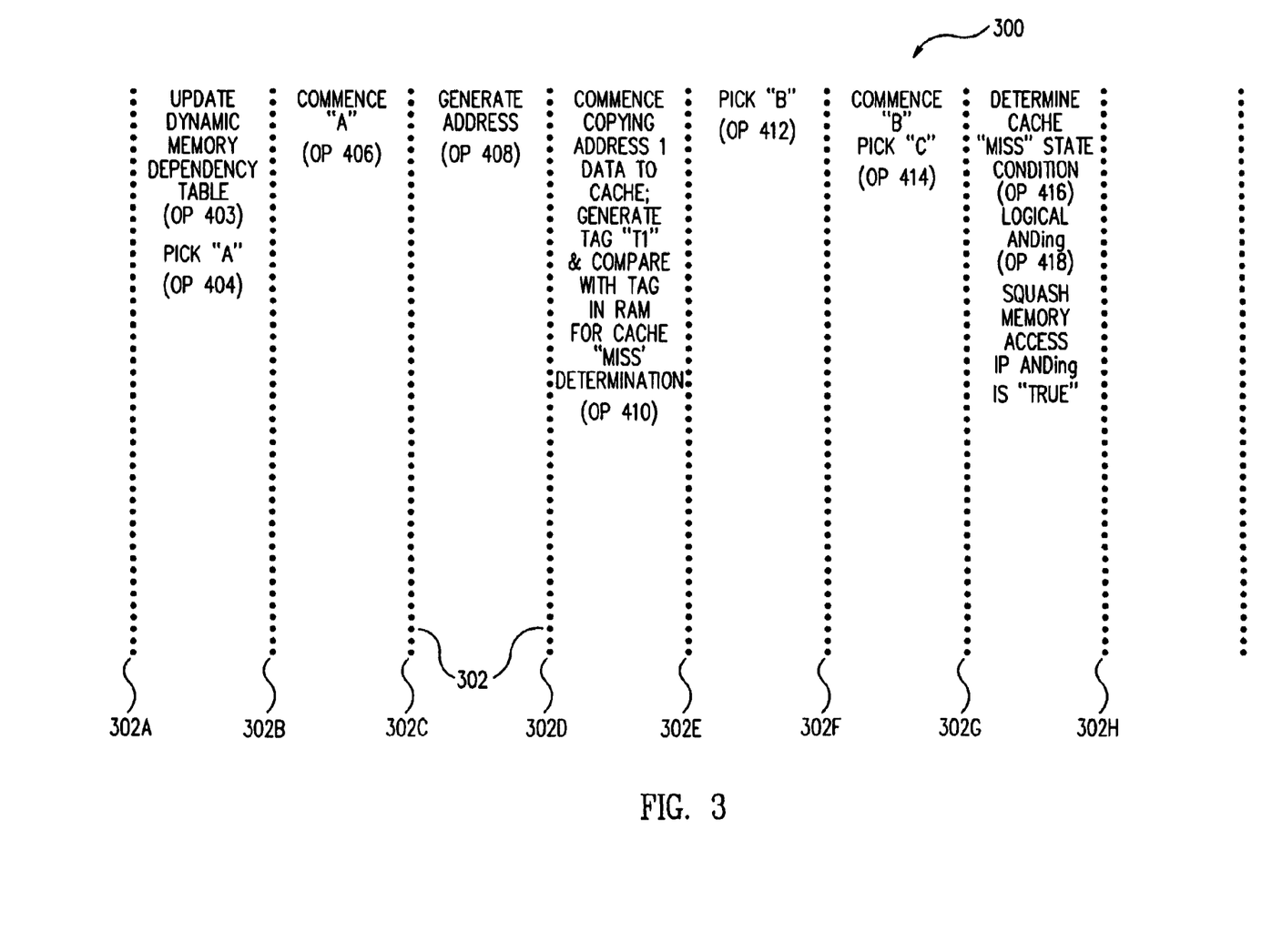
FIG. 3 is a schematic diagram of an operation of a microprocessor pipeline in the microprocessor system of FIG. 1 on the microprocessor program instruction sequence of FIG. 2.
Figure 4A:
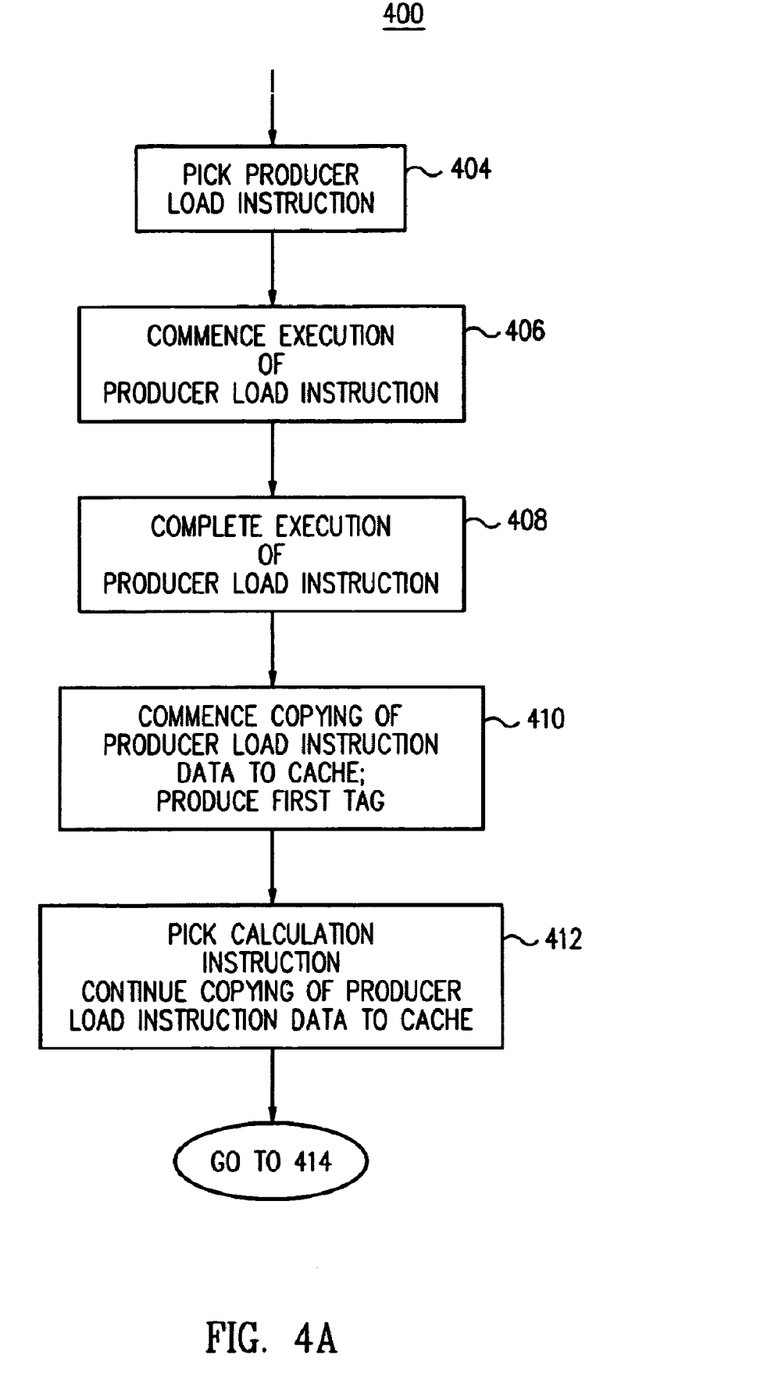
FIGS. 4A and 4B are process flow diagrams showing a method of using the cache pollution avoidance unit 102 of FIG. 1 with the microprocessor program instruction sequence of FIG. 2.
Figure 4B:
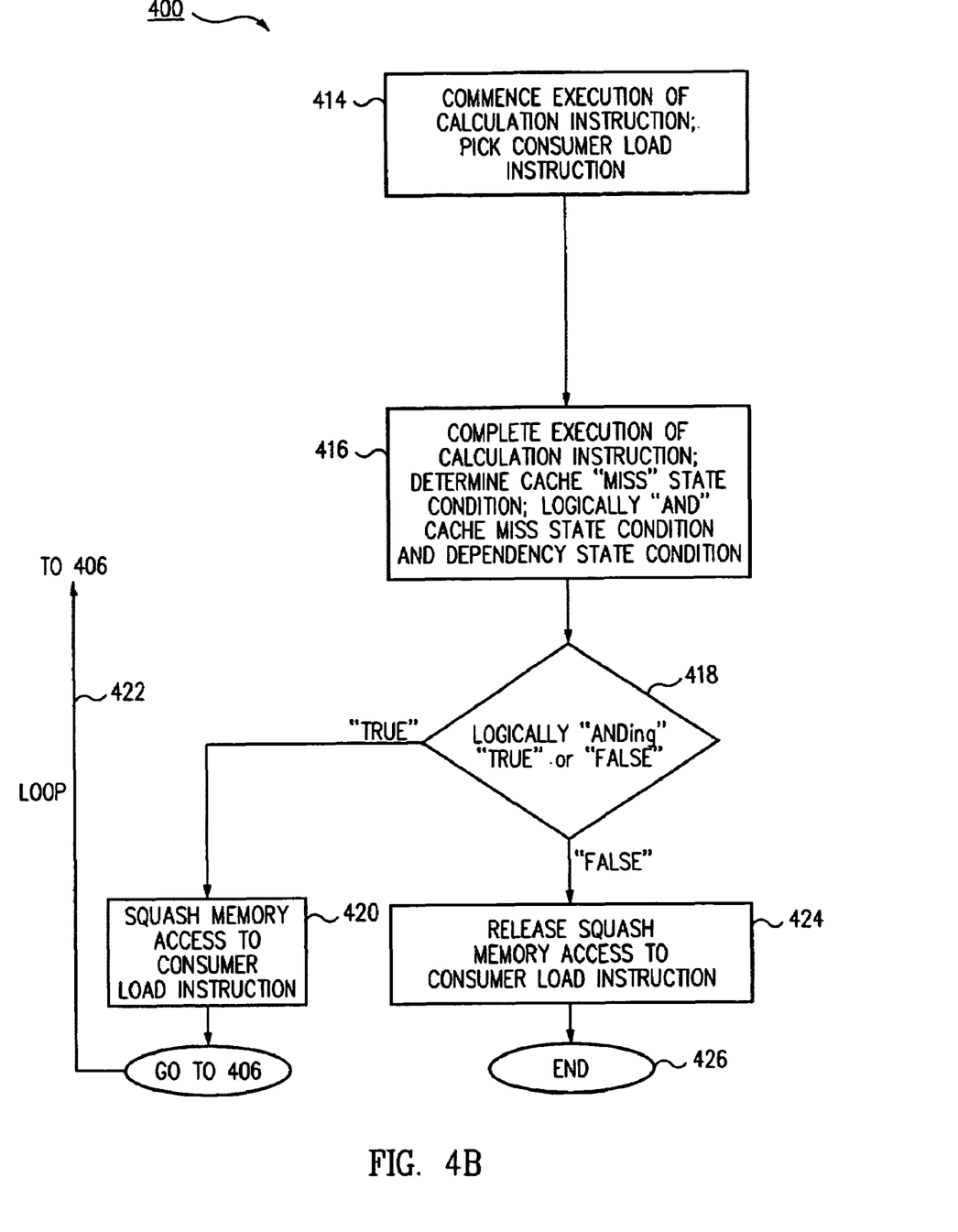

FIG. 3 is a schematic diagram of an operation of a microprocessor pipeline 300 in microprocessor system 100 of FIG. 1 on the microprocessor program instruction sequence 200 of FIG. 2. FIGS. 4A and 4B are process flow diagrams showing a method of using the cache pollution avoidance unit 102 of FIG. 1 with the microprocessor program instruction sequence 200 of FIG. 2.

Referring to FIGS. 1, 2, 3 4A and 4B together, a microprocessor pipeline 300 (FIG. 3) executes the sequence of instructions shown in FIG. 2 during a series of clock cycles 302 indicated by dashed lines. Start operation 402 (FIG. 4A) of method 400 commences the method of using cache pollution avoidance unit 102 for avoiding cache pollution due to speculative memory load operations. It is understood that prior to the commencement of method 400, microprocessor system 100 has fetched and decoded the instructions shown in FIG. 2 which are then available to instruction scheduler 112.

Start operation 402 transfers to update dynamic dependency table operation 403. When it is stated herein that a first operation transfers to a second operation, those of skill in the art understand that the first microprocessor pipeline operation is completed and the second operation is started. In the given microprocessor instruction sequence of FIG. 2, during a first clock cycle 302A (FIG. 3), at operation 403 (FIG. 4) dependency checker 108 (FIG. 1) writes the dependency state condition between producer load instruction "A" and consumer load instruction "C", as determined by dependency checker 108 (FIG. 1), to dynamic memory dependency table 110 (FIG. 1).

Also during first clock cycle 302A, at a pick producer load instruction operation 404, producer load instruction "A" is checked for its register operands and dispatched, sometimes altogether called picked, by instruction scheduler 112.

After producer load instruction "A" is picked, during a second clock cycle 302B, operations 403 and 404 transfer to commence execution of producer load instruction 406 where the execution of load instruction "A" commences in functional unit 114 (FIG. 1). After execution of producer load instruction has commenced, during a third clock cycle 302C, operation 406 transfers to complete execution of producer load instruction operation 408 where execution unit 114 generates first memory location address1 and commences loading the data stored at first memory location address1 to first register r1. After first memory location address1 is generated and the loading of register r1 with the data stored at address1 is commenced, during a fourth clock cycle 302D, operation 408 transfers to commence copying of producer load instruction data to cache operation 410 where execution unit 114 directs cache system 116 to begin copying the data stored at first memory location address1 to a cache memory 117 contained within cache system 116. Also during fourth clock cycle 302D, at operation 410 cache system 116 also separately commences generation and comparison of a first tag T1 (FIG. 3) with a reference tag in random access memory (not shown) of cache system 116 for cache "miss" determination.

After cache system 116 begins copying the data stored at first memory location address1 to cache, during a fifth clock cycle 302E, operation 410 transfers to a pick calculation instruction 412 where calculation instruction "B" is picked by instruction scheduler 112 of microprocessor system 100. At operation 412 cache system 116 continues the operation, commenced at operation 410, of copying the data at first memory address1 to cache memory 117 and continues the comparison of tag T1 with the reference tag in random access memory.

After calculation instruction "B" is picked, during a sixth clock cycle 302F, operation 412 transfers to commence execution of calculation instruction 414 (FIG. 4B) where execution unit 114 starts the summing of the data in register r1 with the data in register r2 for placement in register r3.

However, also during sixth clock cycle 302F, microprocessor system 100 speculatively commences the execution of the "add" operation of calculation instruction "B" without yet knowing whether cache system 116 has completed copying of the data contained in first register r1, as produced by producer load instruction "A" at first memory location address1, into cache memory 117.

Thus, if cache system 116 returns a cache "miss" state condition for first memory location address1 in cache memory 117 in a microprocessor clock cycle 302 that is later than sixth clock cycle 302F, calculation instruction "B" has already commenced execution using erroneous data then in first register r1 and not the desired data contained in first memory location address1 as generated by producer load instruction "A" and as copied to cache memory 117. If a cache "miss" for first memory location address1 occurs, subsequent execution of first consumer load instruction "C" at a clock cycle 302 later than sixth clock cycle 302F likewise loads erroneous operand data contained into erroneously calculated second memory location address2. Since cache system 116 contains the erroneous data stored in erroneously calculated second memory location address2 to cache memory 117, for potential use by sequentially later instructions, erroneous cache data will displace proper cache data in cache memory 117.

Thus, in the prior art and absent cache pollution avoidance unit 102 of the present invention, cache pollution would result. Accordingly, at operation 414 cache system 116 also separately picks consumer load instruction "C", i.e., checks the dependencies of consumer load instruction "C" with sequentially early producer load instruction "A".

After calculation instruction "B" has commenced, during a seventh clock cycle 302G, operation 414 transfers to complete execution of calculation instruction and determine cache "miss" state condition operation 416 where the sum of the of data in register r1 and data in register r2 is returned to register r3. However, as described above, in this example, register r3 may contained the erroneous results of the addition of the erroneous data in register r1 with the data in register r2 at the completion of execution of calculation instruction "B".

Accordingly, during operation 416 the cache memory 117 "miss" state condition for the data stored at address1 is also determined by cache system 116. Also, during operation 416, the determined cache "miss" state condition for the data stored at address1, is logically combined, in one embodiment logically ANDed, with the dependency state condition contained in dynamic memory dependency table 117 of consumer load instruction "B" on producer load instruction "A". In one embodiment, ANDing gate array 103 within cache pollution avoidance unit 102 performs the logical ANDing and outputs the logical result to cache system 116 during operation 416.

While still within seventh clock cycle 302G, operation 416 transfers to logical ANDing result determination operation 418 where the "true" or "false" logical ANDing result, described above, is determined. If the logical ANDing determined at operation 418 is "true", also while still within seventh clock period 302G, operation 418 transfers to squash memory access operation 420 where cache pollution avoidance unit 102 directs execution unit 114 via cache system 116 to squash memory access by consumer load instruction "C" to cache memory 117. Thus squash memory operation 420 stops execution of consumer load instruction "C" and consumer load instruction "C" is prevented from accessing main memory and cache memory 117 from which consumer load instruction "C" is to fetch data stored at address2, which may contain erroneous data. Further, since execution of consumer load instruction is stopped before cache system 116 copies possibly erroneous data to cache memory 117, cache pollution is avoided.

Operation 406 through operation 420 makeup a squash memory loop 422. More than one iteration of squash memory loop 422 may be needed for cache system 116 to provide a "false" result for a cache memory 117 "miss" at operation 418. Stated another way, more than one iteration of squash memory loop 422 may be needed for cache system 116 to provide a "hit" in cache memory 117 for the operand data in second memory location address2 that is required by consumer load instruction "C". Thus, squash memory loop 422 is repeatedly performed until a cache "hit" is returned by cache system 116 for the operand data required by consumer load instruction "C" contained in second memory location address2.

Thus, at some point following operation 418, a cache "hit" is detected for memory location address1 by cache system 116. At that point the logical ANDing of the dependency of consumer load instruction "C" on producer load instruction "A" and the "miss" state condition of first memory location address1, performed by cache pollution avoidance unit 102 at operation 418 will be "false".

When the logical ANDing is determined at operation 418 as "false", also while still within seventh clock cycle 302G, operation 418 transfers to releases squash memory access operation 424 where squash memory access to consumer load instruction "C", if any, is released by cache system 116.

Operation 424 transfers to end operation 426 where method 400 for a ending the operation of method 400.

At this point, cache pollution avoidance unit 102 releases the squash memory access state on consumer load instruction "C". Execution unit 114 completes consumer load instruction "C", thus ending method 400 at end operation 424.

Those of skill in the art will recognize that the sequence of operations and the operations in method 400 are illustrative only of one embodiment of the invention on the example instruction sequence given in FIG. 2 and are not intended to limit the invention to either the sequence of operations or the specific operations listed. For example, method 400 is repeatable for additional load instructions in a microprocessor program being repeated on the additional load insructions until the "end of program" is detected by microprocessor system 100. Further, the logical combination operations discussed above were directed to ANDing operations. However, those of skill in the art will readily recognize that with minimal modifications, other logical operations could be employed. Consequently the specific ANDing operations discussed above were chosen for illustrative purposes only and should not be interpreted to limit the scope of the invention to this specific embodiment.

Figure 5:
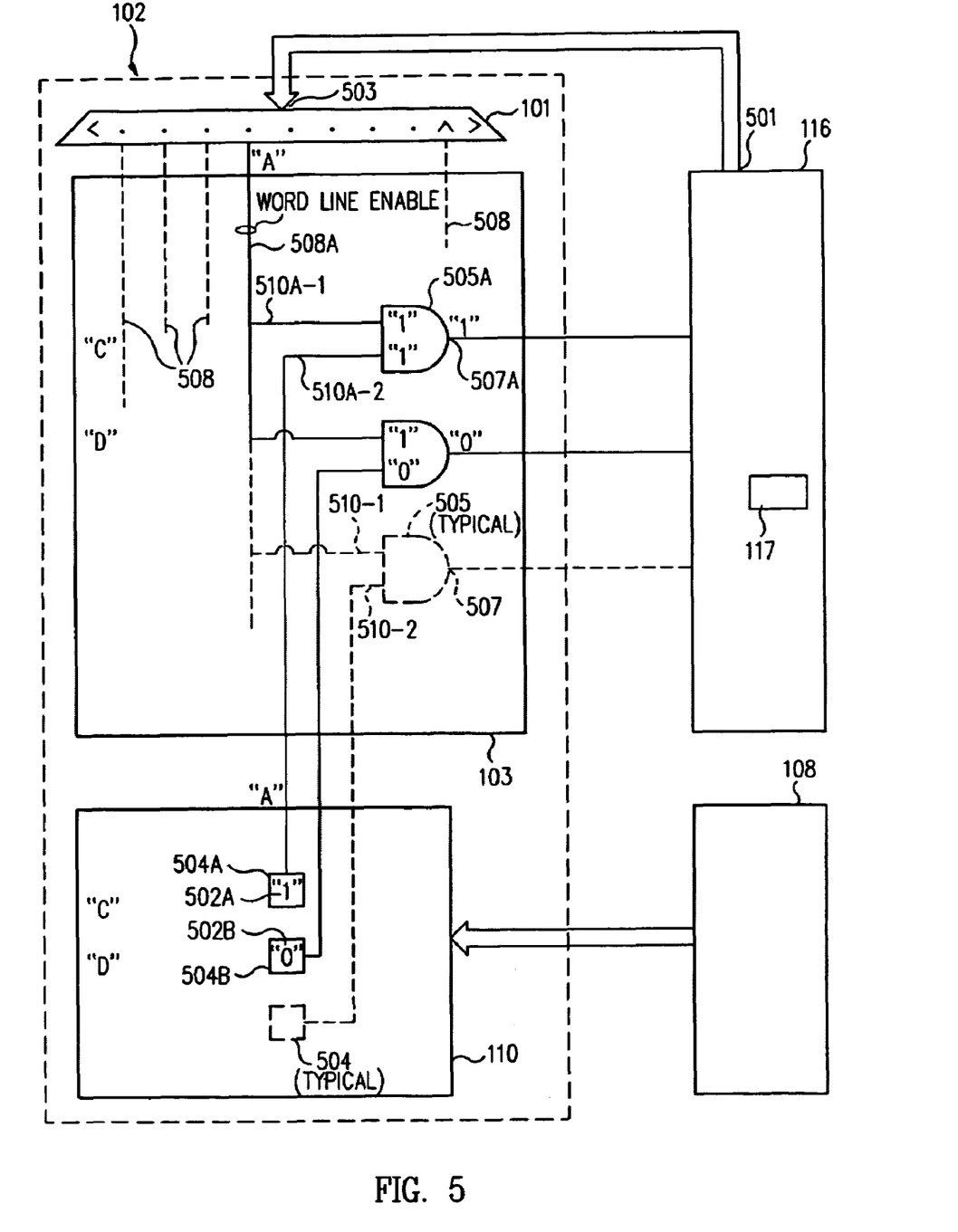
FIG. 5 is a schematic diagram of one embodiment of the cache pollution avoidance unit of FIG. 1.

FIG. 5 is a schematic diagram of one embodiment of cache pollution avoidance unit 102 of FIG. 1. Referring to FIGS. 1 and 5 together, one embodiment of cache pollution avoidance unit 102 is presented in greater detail. Cache pollution avoidance unit 102 includes dynamic memory dependency table 110. As described briefly above, dynamic memory dependency table 110 is a "n" row by "n" column table consisting of a plurality of dependency table memory cells 502, formed as an array of conventional microprocessor system RAM cells.

Dependency table memory cells 502 are capable of storing one-bit binary values, sometimes called "flags", representing either a "true"/"false" condition of the dependency states among individual producer load instructions and individual consumer load instructions, sometimes called dependency intersections 504, as determined by dependency checker 108.

Each row in dynamic memory dependency table 110 contains "n" binary bits ("1's" or "0's") each of which mark the dependency state condition between the two individual load instructions at the various dependency intersections 504 in each row. Each row of dynamic dependency table 110 describes the dependency state conditions of an individual load instruction at the dependency intersections 504 with all sequentially earlier load instructions currently in instruction buffer 111. Each row remains dedicated to a particular load instruction while the particular load instruction remains in instruction buffer 111.

After a load instruction in instruction buffer 111 is executed by execution unit 114, a sequentially later microprocessor load instruction is fetched/decoded and replaces the executed instruction in the microprocessor instruction buffer 111 of instruction scheduler 112. The row in dynamic memory dependency table 110 dedicated to the executed instruction is now available and is overwritten with the dependency state conditions at the dependency intersections 504 between the replacement sequentially later microprocessor load instruction and the sequentially earlier load instructions remaining in instruction buffer 111.

In one embodiment, a binary "1" in a dependency table memory cell 502 represents a "true" dependency state condition and a binary "0" represents a "false" dependency state condition at dependency intersection 504 between a particular producer load instruction and a particular consumer load instruction.

Illustratively, with reference to FIGS. 1, 2, and 5, dependency table memory cell 502A contains a binary "1" value within dynamic dependency table 110 at a first dependency intersection 504A between producer load instruction "A" and consumer load instruction "C." Further, dependency table memory cell 502B contains a binary "0" value within dynamic dependency table 110 at a second dependency intersection 504B of independent consumer load instruction "D" (FIG. 2) on producer load instruction "A". The "0" value of dependency table memory cell 504B represents a "false" dependency state condition between producer load instruction "A" and second consumer load instruction "D". In the example of FIG. 1, data in memory location address3, from which second consumer load instruction "D" loads data, is programmatically independent of the results produced by the execution of producer load instruction "A".

Cache pollution avoidance unit 102 further includes cache miss ID decode unit 101 (FIGS. 1 and 5) coupled at a cache miss ID decode input 503 to a cache miss state condition output 501 of cache system 116. Cache miss ID decode unit 101 receives at cache miss ID decode input 503 the cache "miss" state condition supplied by cache system 116 at cache miss state condition output 501 and converts the cache "miss" state condition to word line enables understood cache pollution avoidance unit 102. Cache miss ID decode unit 101 outputs cache miss ID decode outputs 508.

In one embodiment, cache pollution avoidance unit 102 further includes an ANDing gate array 103 made up of a plurality of two-input/one-output AND gates 505 coupled to cache miss ID decode unit 101. Individual cache miss ID decode outputs 508 from cache miss ID decode unit 101 are coupled to ANDing gate first inputs 510-1 at separate AND gates 505 dedicated to each dependency intersection 504 between individual producer load instructions and individual consumer load instructions.

Each dedicated AND gate 505 of ANDing gate array 103 is also coupled to dynamic memory dependency table 110. An ANDing gate second input 510-2 of each AND gate 505 is connected to a separate dependency table memory cell 502 containing the "true"/"false" dependency state condition between individual producer load instructions and individual consumer load instructions. As noted above "true"/"false" dependency state conditions between individual producer load instructions and individual consumer load instructions is dynamically supplied and updated by dependency checker 108 throughout program execution. The logical ANDing result of an individual ANDing gate 505 is output as ANDing gate output 507.

Illustratively, using the example program segment of FIG. 2 as described above, dependency table memory cell 502A, which represents the dependency state condition at dependency intersection 504A between consumer load instruction "C" and producer instruction "A", contains a binary "1" value. As noted above, in this embodiment, the binary "1" value in dependency table memory cell 502A indicates that consumer load instruction "C" is dependent, indirectly through calculation instruction "B", on the data located in microprocessor memory first memory location address1. Further, as also noted above, at the completion of execution of producer load instruction "A", the data located in microprocessor memory first memory location address1 is the correct data required by consumer load instruction "C". Finally, as also noted above, at the completion of execution of producer load instruction "A", the data at first memory location address1 is copied to cache memory 117 (FIGS. 1 and 5) for use by instructions sequentially later than producer load instruction "A". The "1" value contained in dependency table memory cell 502A is coupled to ANDing gate second input 510A-2 of ANDing gate 505A.

ANDing gate 505A outputs the logical ANDing result of ANDing gate first input 510A-1 and ANDing gate second input 510A-2 to cache system 116 as ANDing gate output 507A. If ANDing gate output 507A is "true", i.e., has a binary value of "1", cache systems 116 directs execution unit 114 to squash memory access to consumer load instruction "C". If ANDing gate output 507A is "false", is i.e., has a binary value of "0", memory access to consumer load instruction "C" is not squashed by cache system 116.

ANDing gate output 507A is "true" so long as both ANDing gate first input 510A-1 and ANDing gate second input 510A-2 are true. In the example given, ANDing gate first input 510A-1 is always true when both producer load instruction "A" and consumer load instruction "C" are in instruction buffer 111 of microprocessor system 100 (FIG. 1). In the example given, the dependency state condition between producer load instruction "A" and consumer load instruction "C" is programmatically fixed as "true".

However, ANDing gate first input 510A-1 is true only when a cache "miss" returned by cached system 116 is true for the operand data required by consumer load instruction "C" as contained in first memory location address1 at the completion of the execution of producer load instruction "A". Thus, when cache system 116 returns a "false" cache "miss" condition, i.e., when cache miss ID decode output 508A has a binary value of "0", memory access to consumer load instruction "C" is released. At this point consumer load instruction "C" may access memory to load accurate operand data located at second memory location address2. Since cache system 116 copies only accurate operand data in second memory location address2 to cache memory 117, inaccurate cache data is not created. Thus, cache pollution avoidance unit 102 avoids the creation of cache pollution due to the speculative execution of consumer load instruction "C".

In one another embodiment, dynamic dependency table 110 is replaced with lists of unique producer load instruction IDs (not shown) for each consumer load instruction "C". When producer load instruction "B" misses in cache, a comparator (not shown), replacing ANDing gate array 103, is used to squashed memory access to dependent consumer load instruction "C". This embodiment is advantageous because it requires relatively small instruction buffers and lower frequency microprocessors.

As discussed above, the present invention provides a system, method, and microprocessor architecture for avoiding cache pollution caused by speculative memory load operations. While configurations and methods according to the invention have been particularly shown and described with reference to a specific embodiment, it will be understood by those skills in the art that various other changes in the form and details may be made without departing from the spirit and scope of the invention. For example, the logical combination operations discussed above were directed to ANDing operations. However, those of skill in the art will readily recognize that with minimal modifications, other logical operations could be employed. Also, the size of the dynamic memory dependency table is not limited to an "n" row by "n" column table where "n" is the size of the microprocessor instruction buffer. Accordingly, these and other variations are equivalent to the specific implementations and embodiments described herein.

We claim:

1. A method for avoiding cache pollution in a microprocessor system comprising:
    determining a dependency state condition between a first load instruction and a second load instruction;
    storing said dependency state condition in a dynamic memory dependency table;
    determining a miss state condition in a cache for said second load instruction;
    decoding said miss state condition for said second load instruction to a decoded miss state condition ID;
    logically combining said dependency state condition and said decoded miss state condition identification (ID); and
    quashing execution of said second load instruction if said logically combining results in a true condition.

2. The method of claim 1 wherein said logically combining comprises logically ANDing.

3. The method of claim 2 further comprising re-scheduling said second load instruction for execution if said logically combining results in a true condition.

4. The method of claim 1 wherein said dynamic memory dependency table comprises random access memory cells.

5. The method of claim 1 wherein said logically combining said dependency state and said decoded miss state condition ID employs a logical combining gate in a gate array.

6. A microprocessor system for avoiding cache pollution comprising:
    a dependency checker for determining a dependency state condition between a first load instruction and a second load instruction;
    an instruction scheduler coupled to said dependency checker, said instruction scheduler having an instruction buffer storing said first load instruction and said second load instruction, said instruction scheduler scheduling execution of said first load instruction and said second load instruction;
    an execution unit coupled to said instruction scheduler;
    a cache system having a cache memory and coupled to said execution unit, said cache system having a cache miss state condition output for a cache miss state condition in said cache memory for said first load instruction;
    a cache pollution avoidance unit coupled to said cache system and coupled to said dependency checker said cache pollution avoidance unit comprising:
        a dynamic memory dependency table storing said dependency state condition between said first load instruction and said second load instruction;
        a cache miss identification (ID) decode unit having a cache miss ID decode input coupled to said cache miss state condition output of said cache system and having a cache miss ID decode output;
        a logical combining gate having a gate first input coupled to said dependency state condition between said first load instruction and said second load instruction stored in said dynamic memory dependency table, said logical combining gate having a gate second input coupled to said cache miss ID decode output of said cache miss ID decode unit, said logical combining gate having a gate output; and
    wherein said instruction scheduler squashes execution by said execution unit of said second load instruction stored in said instruction buffer whenever said output of said logical combining gate is true.

7. The microprocessor system for avoiding cache pollution of claim 6 wherein said logical combining gate comprises a logically ANDing gate.

8. The microprocessor system for avoiding cache pollution of claim 6 wherein said scheduling unit re-schedule execution of said second load instruction whenever said output of said logical combining gate is true.

9. The microprocessor system for avoiding cache pollution of claim 6 wherein said dynamic memory dependency table comprises random access memory cells.

10. The microprocessor system for avoiding cache pollution of claim 6 wherein said logically combining gate is a member of a gate array.

* * * * *